UNITED STATES PATENT OFFICE.

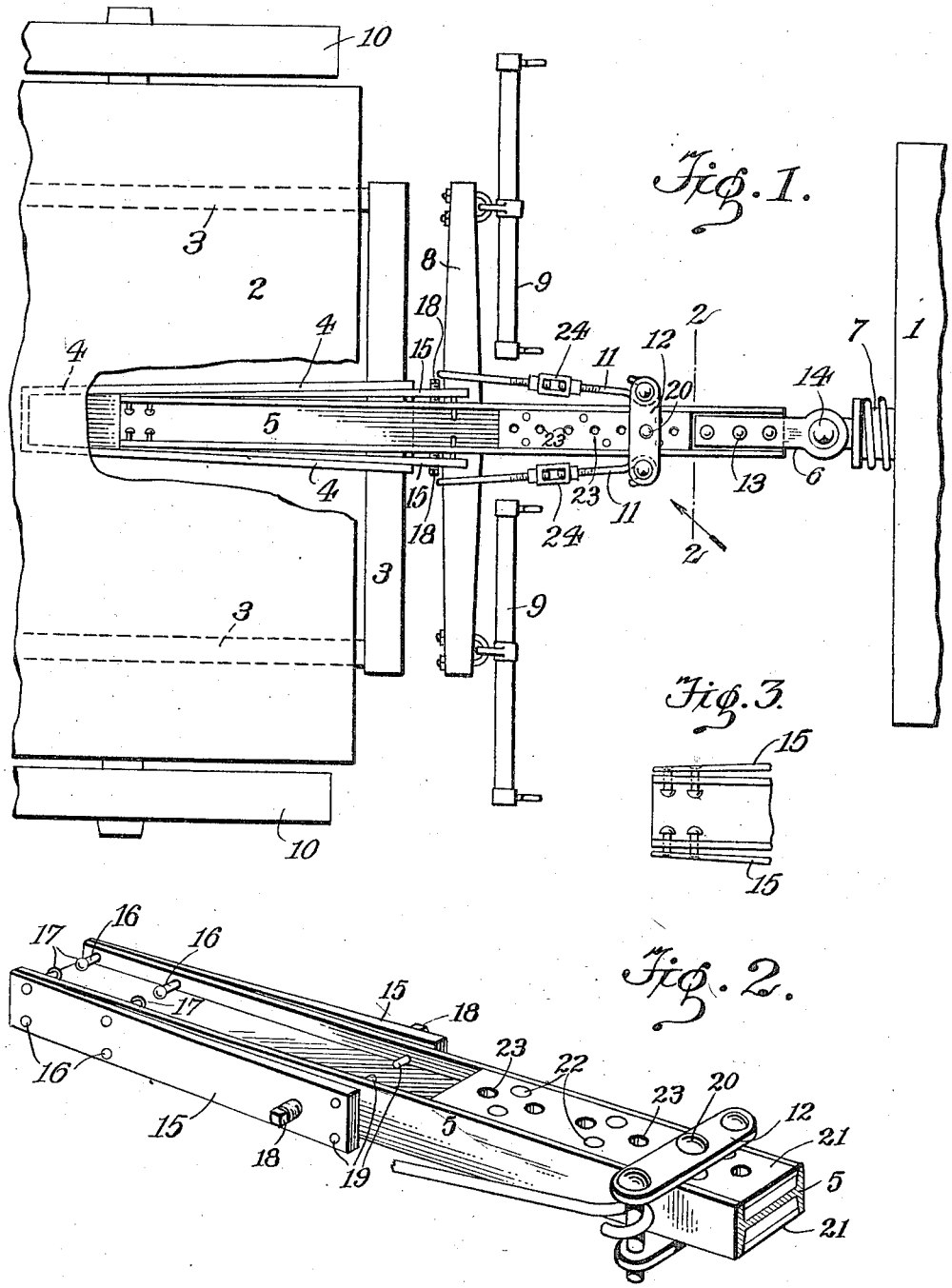
L. C. OWENS.
COUPLING DEVICE FOR VEHICLES.
APPLICATION FILED JAN. 25, 1919.
1,301,307.
Patented Apr. 22, 1919.

LOUIS C. OWENS, OF NEW YORK, N. Y.

COUPLING DEVICE FOR VEHICLES.

1,301,307.  Specification of Letters Patent.  Patented Apr. 22, 1919.

Application filed January 25, 1919. Serial No. 272,980.

*To all whom it may concern:*

Be it known that I, LOUIS C. OWENS, a citizen of the United States, and a resident of the borough of Manhattan, city, county, and State of New York, have invented certain new and useful Improvements in Coupling Devices for Vehicles, of which the following is a specification, reference being had to the accompanying drawings.

This invention is allied to and is an improvement upon that for which I filed application for Letters Patent of the United States on December 21, 1918, Serial No. 267,740; and the purpose of the present invention is to secure more perfect engagement between the body part of the coupler and the pole socket of the running gear of the truck or trailer in the event that the socket shall be of a size or construction with which the tapered end of the body part of the coupler will not accurately engage.

Referring to the drawings, Figure 1 is a plan view of the parts composing my invention assembled with a tractor and trailer, the two latter being indicated merely; Fig. 2 is a perspective view of the tapered or rear end of the body part of the coupler somewhat enlarged; Fig. 3 is a view of a detail.

In the drawings 1 represents the tractor, 2 the trailer, 3 portions of the frame of the trailer, 4 the pole socket built into the running gear of the trailer, 5 the body part of the coupler, 6 the yoke on the forward end of the body part of the coupler, 7 the tractor draw bar, 8 the evener and 9, 9, the whiffletrees. 10, 10, represent the wheels of the trailer, 11, 11, are rods, which at their rear ends engage with the evener 8, and at their forward ends engage with a slidable sleeve 12, 13 bolts which fasten the yoke 6 to the body part of the coupler, 14 a pin which passes through the eyes of the yoke 6 and the link on the end of the tractor draw bar 7 to connect them together. All the foregoing parts are or may be substantially as set forth in my said application, Serial No. 267,740.

It frequently happens that the rear end of the body part of the coupler will not accurately fit the tapering interior of the pole socket, so that there may be considerable lateral movement between them which interferes with the proper control of the front wheels of the trailer. It is the purpose of this present invention, therefore, to provide means whereby this difficulty may be overcome and a desirable snug fit secured.

The body part 5 of the coupler may be made of wood or metal as desired, but I prefer that it shall be in the form of a metal I beam of suitable strength and I therefore so illustrate it.

15, 15, are two metal plates which may advantageously, but not necessarily, be somewhat thinner at their rear end than at their front end. They are preferably about as wide as the flanges of the I beam and of sufficient thickness and strength to serve the purpose. 16, 16, are pins rigidly set in the plates 15, either by being threaded to them or otherwise securely fastened. Their number may be such as illustrated, or more or less. Their function is to hold the plates 15 in proper relation to the I beam and yet permit lateral separation between them and it. In order to permit this the pins are made sufficiently long to project somewhat within the I beam and their inner ends 17 are headed, as shown, so as to prevent the entire separation of the plates from the I beam; and in order to allow for the stated lateral movement the holes through the flanges of the I beam are made somewhat larger than the pins.

18, 18, are set screws which are threaded into the plates 15 near their thicker or forward ends and the inner ends of these screws take a bearing against the flanges of the I beam, and in order to maintain the forward ends of the plates in position other pins 19, which are preferably formed on the arc of a suitable circle, are rigidly set into the plates and pass freely through the holes in the flanges of the I beam, so as to freely permit outward swinging movement of the forward ends of the plates 15.

20 is a pin which engages the slidable sleeve 12 with the body part of the coupler, and in order that there may be sufficient contacting surfaces between them so as to avoid bending or cutting the pin, which might result if it were passed through the relatively thin web of the I beam only, I prefer to fill in the I beam at the appropriate part with plates 21, one on each side, which may be rigidly held in place by rivets or headed bolts 22, preferably made flush or substantially so with the outer surface of the plate 21, and along the central line of these plates and passing also through the web of the I beam I make a series of holes 23 through which the pin passes for the adjustment of the sliding sleeve 12, as fully set forth in my said application.

The rods 11 are made in two parts, as shown, connected by turn buckles 24.

The operation is as follows:

Before adjusting the coupler to the socket of the trailer the set screws 18 are so manipulated that the plates 15 may rest against the sides of the I beam. The rear end of the body part of the coupler is then introduced into the socket and shoved rearwardly therein as far as it will go, during which operation the pressure of the tapering sides of the socket will press the rear and preferably thin ends of the plates 15 into contact with the sides of the I beam. When further insertion of the body part of the coupler is resisted because of the taper of the socket, the set screws 18 are turned so that the forward ends of the plates 15 will move laterally or outwardly into engagement with the tapering sides of the socket, the inner ends of the set screws being supported against the sides of the I beam. In this way rigid engagement between the body part of the coupler and the pole socket will be afforded. Thereupon the rearward hooked ends of the rods 11 are placed over the evener 8, which of course is rigidly connected with the socket mechanism of the trailer, or engaged with some other suitable part of the trailer, and the sliding sleeve 12 is moved as may be necessary to engage its pin 20 with the appropriate hole 23 in the body part of the coupler, as fully described in my said application, in so doing passing through the upper and lower plates of the sliding sleeve 12 and through the holes 23 in the two filling plates 21 and through the web of the I beam forming the body part 7 of the coupler. Since there will almost always be some lost motion, greater or less in degree as the relation of the parts may necessitate, I take up this lost motion by proper manipulation of the turn buckles 24, whereupon not only will fixed relation result between all parts, but also the body part of the coupler will be held, by the rods 11, in its most rearward position in close and consequently accurate engagement with the socket of the trailer. To remove the coupler from the trailer for use if desired upon another trailer or otherwise, all that is necessary is to unscrew the turn buckles 24, disengage the hooked ends of the rods 11 from the evener 8, or equivalent part, slightly turn the set screws 18, if that shall be necessary, and pull the coupler from the socket.

It will be obvious to those who are familiar with such matters that modifications may be made in the details of the form of the invention herein described and illustrated without departing from the essentials thereof, since the form shown is one only in which the invention may be embodied. I therefore do not limit myself to such details.

I claim:

1. In a coupling device for vehicles a continuous rigid coupler body part having rigidly attached at its forward end means for connection with the drawbar of a tractor and having also laterally movable plates attached upon opposite sides at its rear end, and means carried by the plates to move them into the desired lateral position and hold them there.

2. In a coupling device for vehicles a continuous rigid coupler body part having rigidly attached at its forward end means for connection with the drawbar of a tractor and having also laterally movable plates attached upon opposite sides at its rear end, supporting means for the plates rigidly attached to them and movably engaging with the coupler body part, and means whereby said plates may be separately moved into the desired lateral position and held there.

3. In a coupling device for vehicles a continuous rigid coupler body part having rigidly attached at its forward end means for connection with the drawbar of a tractor and having also laterally movable plates attached upon opposite sides at its rear end, a slidable sleeve adapted to move longitudinally over and engage with the coupler body part, longitudinally adjustable rods adapted to connect the slidable sleeve with a suitable fixed part of the vehicle, and means to move the plates into the desired lateral position and hold them there.

4. In a coupling device for vehicles a continuous rigid coupler body part having rigidly attached at its forward end means for connection with the drawbar of a tractor and having also laterally movable plates attached upon opposite sides at its rear end, supporting means attached to the plates and movably engaging with the body part, a slidable sleeve adapted to longitudinal adjustment upon and engagement with the body part, longitudinally adjustable rods adapted to connect the slidable sleeve with a suitable fixed part of the vehicle, and means to move the plates into the desired lateral position and hold them there.

In witness whereof I have signed my name to this specification.

LOUIS C. OWENS.

Copies of this patent may be obtained for five cents each, by addressing the "Commissioner of Patents, Washington, D. C."